(12) United States Patent
Iyengar et al.

(10) Patent No.: US 8,711,734 B2
(45) Date of Patent: Apr. 29, 2014

(54) METHOD AND SYSTEM FOR FAIL-SAFE CALL SURVIVAL

(75) Inventors: Rajan Iyengar, Fredericton (CA); Gabriel Bourque, Oromocto (CA); Brian Evans, Hanwell (CA); Jason McCarthy, Hanwell (CA); James Terhune, Fredericton (CA)

(73) Assignee: Indosoft Inc., Fredericton, New Brunswick (CA)

( * ) Notice: Subject to any disclaimer, the term of this patent is extended or adjusted under 35 U.S.C. 154(b) by 0 days.

(21) Appl. No.: 13/162,701

(22) Filed: Jun. 17, 2011

(65) Prior Publication Data

US 2011/0310773 A1 Dec. 22, 2011

Related U.S. Application Data

(60) Provisional application No. 61/344,249, filed on Jun. 18, 2010.

(51) Int. Cl.
*H04L 12/16* (2006.01)

(52) U.S. Cl.
USPC .............................................. 370/259

(58) Field of Classification Search
USPC ........... 370/217, 401; 709/223; 714/43, 4, 39; 711/162
See application file for complete search history.

(56) References Cited

U.S. PATENT DOCUMENTS

| | | | |
|---|---|---|---|
| 6,480,944 B2 * | 11/2002 | Bradshaw et al. | 711/162 |
| 6,674,713 B1 * | 1/2004 | Berg et al. | 370/217 |
| 6,992,974 B1 | 1/2006 | Tripathi | |
| 7,095,747 B2 * | 8/2006 | Sarmiento et al. | 370/401 |
| 7,664,014 B2 | 2/2010 | Schoeneberger et al. | |
| 7,688,804 B2 | 3/2010 | Peters | |
| 2001/0047406 A1 * | 11/2001 | Araujo et al. | 709/223 |
| 2005/0278583 A1 * | 12/2005 | Lennert et al. | 714/43 |
| 2009/0013210 A1 * | 1/2009 | McIntosh et al. | 714/4 |
| 2009/0287964 A1 * | 11/2009 | Morris | 714/39 |

\* cited by examiner

*Primary Examiner* — Asad Nawaz
*Assistant Examiner* — Parth Patel
(74) *Attorney, Agent, or Firm* — Stephen F. Swinton, Jr.; Hoffman Warnick LLC

(57) ABSTRACT

The present invention provides a system and method for fail-safe call survival by detecting failure of an active call serving component and switching the service over to a standby component. The system and method will prevent an existing call, whether established or to be established, from being dropped due to a single point of failure within a Voice over Internet Protocol system. The continuation of the call is based on the failed component as opposed to relying on communication endpoints to re-initiate or re-route the failed call. Call recovery is initiated independent from the call path of a call. The detection of a condition or need for call recovery and the determination to initiate call recovery procedures are made without involving endpoints or intermediate points of the call. The availability and sanity of all components are continuously monitored and are tailored specifically for the duties of each component.

18 Claims, 2 Drawing Sheets

METHOD AND SYSTEM FOR FAIL-SAFE CALL SURVIVAL

REFERENCE TO RELATED APPLICATIONS

The current application claims the benefit of co-pending U.S. Provisional Application No. 61/344,249, "Method and system for fail-safe call survival," which was filed on 18 Jun. 2010, and which is hereby incorporated by reference.

TECHNICAL FIELD OF THE INVENTION

The present invention generally relates to telecommunication systems, and in particular to methods and systems for providing call survival within a communication network, including a Voice over Internet Protocol (VoIP) network, which may be interconnected to a Public Switched Telephone Network (PSTN), a traditional Time Division Multiplexing (TDM) network, or another VoIP network.

BACKGROUND OF THE INVENTION

Internet Protocol (IP) networks and systems have been used to deliver voice, data, or video communications. For example, VoIP systems may employ various signaling protocols for establishing and terminating calls between communication endpoints such as phones, and employ media transportation protocols for exchanging voice packets between the endpoints over a communication network.

However, a call connected through a VoIP system may sometimes be dropped or fail to establish if a server or a component of the VoIP system has failed or become unavailable.

Some high availability and redundancy solutions are known in the art. For example, U.S. Pat. No. 7,664,014 mentions recovery of voice packets loss using stored Session Description Protocol (SDP) information of the media portion of a call. However, this proposed solution is inefficient because it does not detect the exact location of the failure. Rather, upon detecting an undeliverable voice packet sent by a first gateway, the call is re-presented using another gateway regardless of whether there has been any fault occurring in the first gateway. U.S. Pat. No. 7,688,804 proposed another system where a monitoring server is inserted into a call path so that when one user agent fails, the monitoring server re-routes the call to the other user agent. This proposal is also inefficient because it introduces a new component into the call path. Furthermore, the added monitoring server creates a point of potential failure that cannot be recovered.

Other prior art high availability and redundancy solutions, such as the system proposed in U.S. Pat. No. 6,992,974, generally require the communication endpoints to detect failure of a call handled by a primary server and accordingly reinitiate the failed call using a backup server. Disadvantageously, with this approach, call recovery takes a long time, resulting in unsatisfactory caller experience. Another disadvantage associated with long recovery time is that a caller is more likely to disconnect or give up the call before the endpoint system has a chance to initiate the recovery of the failed call.

Therefore, there remains a need for a method and system for providing fast fail-safe call survival from a single point of failure within a VoIP system.

SUMMARY OF THE INVENTION

In accordance with the present invention, fast fail-safe call survival can be achieved by detecting failure of at least one active call serving component and accordingly switching the service over to at least one standby component. The present invention therefore discloses a system and method for preventing an existing call, whether established or to be established, from being dropped due to a single point of failure within a VoIP system.

Advantageously, the present invention provides a system and method for seamless continuation of the call based on the failed component as opposed to relying on communication endpoints to re-initiate or re-route the failed call. In accordance with various embodiments of the present invention, call recovery is initiated by a recovery means that is independent from the call path of a call. In other words, the detection of a condition or need for call recovery and the determination to initiate call recovery procedures are made without involving endpoints or intermediate points of the call.

The availability and sanity of all components are continuously monitored by detection and monitoring means such as watchdog programs. These detection and monitoring means are provided for each component and are tailored specifically for the duties of the component.

The present invention provides means for managing or overseeing fail-safe components and means for initiating call recovery. Such overseeing means/call recovery means monitors each and every watchdog program. Once the overseeing means detects a component fault from a watchdog program, it automatically begins the recovery procedures needed to recover the failed component. As such, the system of the present invention is able to continue to operate through failure of any component in the VoIP system without any user intervention.

According to one aspect of the present invention, there is provided a system for providing a telecommunication service to a call, the call being established or to be established between at least two endpoints, the system comprising: a plurality of servers, at least one server being active to provide the service, at least one server waiting to be activated to provide the service; and recovery means for determining unavailability of each server for providing the service and activating the at least one waiting server, the determination and activation being independent from the call; wherein when an active server is determined to be unavailable, an available waiting server is activated to provide the service without interruption to the call and without involvement of the at least two endpoints.

According to another aspect of the present invention, there is provided a method of providing a telecommunication service to a call, the call being established or to be established between at least two endpoints, the method comprising the steps of: a) providing a plurality of servers, at least one server being active to provide the service, at least one server waiting to be activated to provide the service; and b) providing recovery means for performing the steps of: b1) determining unavailability of each server for providing the service; and b2) if an active server is determined to be unavailable, activating an available waiting server to provide the service without interruption to the call and without involvement of the at least two endpoints; wherein the determination and activation are performed independent from the call.

According to another aspect of the present invention, there is provided a computer readable memory having recorded thereon statements and instructions for execution by a computer for providing a telecommunication service to a call, the call being established or to be established between at least two endpoints, the statements and instructions comprising: means for providing and configuring a plurality of servers, at least one server being active to provide the service, at least one server waiting to be activated to provide the service; and recovery means for determining unavailability of each server for providing the service and activating said at least one waiting server, the determination and activation being independent from the call; wherein when an active server is determined to be unavailable, an available waiting server is activated to provide the service without interruption to the call and without involvement of the at least two endpoints.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
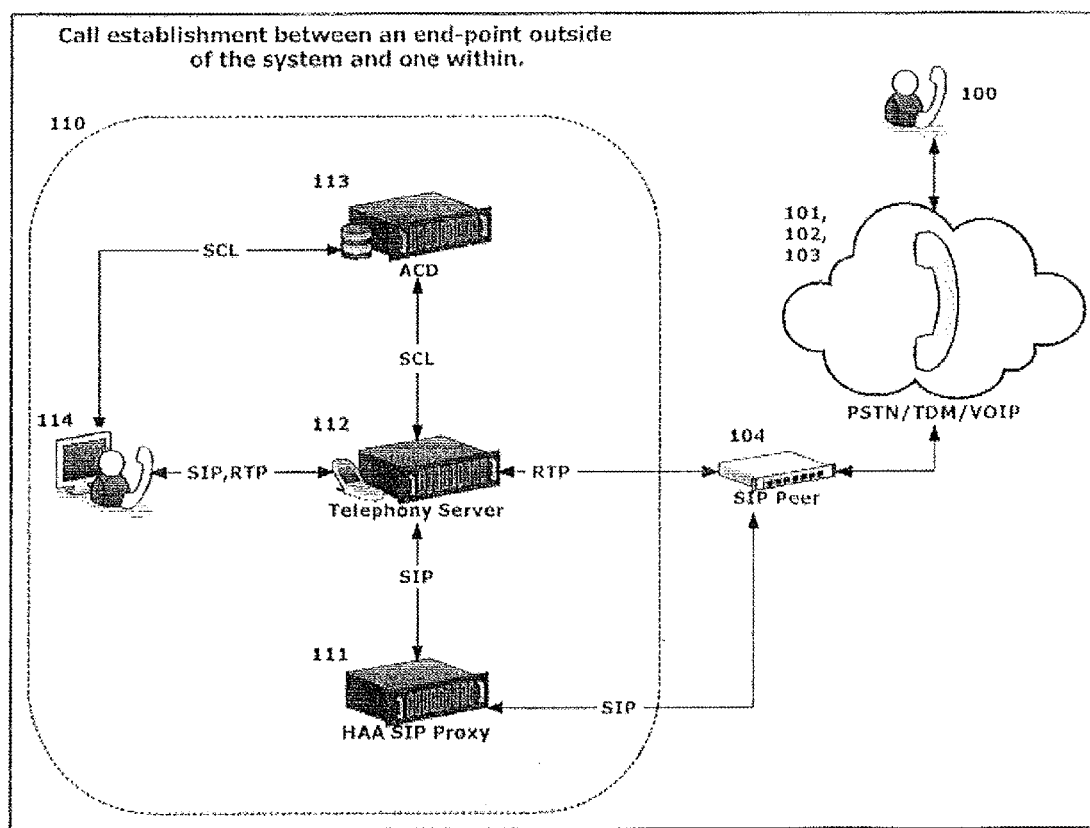
FIG. 1 illustrates a graphical representation of a call setup between one endpoint which exists within a communication network external the system, and another endpoint which exists internally within a system in accordance with one embodiment of the present disclosure.

Referring to FIG. 1 and in accordance with one embodiment of the VoIP system 110 described herein, there is shown a call from an external communication endpoint 100 to a communication endpoint 114. The call may be connected through the public switched telephone network (PSTN) 101, a time division multiplexing (TDM) network 102, a VoIP network 103, or any combination of the above networks, and connected via a Session Initiation Protocol (SIP) peer 104.

In the example illustrated in FIG. 1, endpoint 100 exists within a communication network external to the VoIP system 110, while endpoint 114 exists internally within the VoIP system 110, with a SIP peer 104 ultimately bridging the external endpoint with the system 110. However, the present invention is not limited to calls between an internal endpoint and an external endpoint of the system 110. For example, various embodiments of the present invention as described herein can be employed for calls between multiple internal endpoints 114 that might have been facilitated by an internal SIP proxy server, as well as between multiple external endpoints 100 or multi-party conference calls involving a mixture of one or more internal endpoint 114 and one or more external endpoint 100.

In the present description, a call is to be understood as generally involving call control signaling and media exchange, and is generally established between two or more communication endpoints. A call is not limited to a voice call, and may include exchange of any type of digital or analog media over any communication network. As such, communication endpoint 100 is not limited to a phone and should be understood to include any device that is capable of initiating or communicating a call. For example, such devices may include phones, including analog telephones, computers, and any communication software and/or hardware, including VoIP hardware-based phones, and VoIP software-based phones.

The VoIP system 110 comprises certain commonly known components such as a telephony server 112, an Automatic Call Distributor (ACD) 113, and a HAA SIP proxy server 111. The VoIP system 110 further comprises other components or servers as will be described hereinafter.

Still referring to FIG. 1, to establish the call originating from the external endpoint 100 and through 101 (or 102 or 103) to the SIP peer 104, the SIP peer 104 sends a SIP invite command to the HAA SIP proxy 111. The HAA SIP proxy 111 modifies the SIP headers setting the "destination" Internet Protocol (IP) address to the address of the telephony server 112 as well as the "origination" IP address to the address of the HAA SIP proxy 111. This is done in order to separate the call portion between the SIP peer 104 and beyond within the system 110 into two call legs: the first call leg being communication between the SIP peer 104 and the telephony server 112, whereas the second call leg being communication between the telephony server 112 and the endpoint 114. Additional modifications to the SIP headers include the insertion of a Universally Unique Identifier (UUID) which the HAA SIP proxy 111 creates. This will be used to uniquely identify the call globally and within the VoIP system 110 throughout the life of the call.

After receiving the SIP invite command from the SIP peer 104, the HAA SIP proxy 111 sends the invite command to the telephony server 112. This is followed by standard SIP response (an OK) from the telephony server 112 through the HAA SIP proxy 111 to the SIP peer 104 with the HAA SIP proxy 111 performing appropriate header modification and address translations. This initial negotiation is completed with an acknowledgment in the form of a SIP ACK passed from the SIP peer 104 through the HAA SIP proxy 111 to the telephony server 112 again with the HAA SIP proxy 111 performing appropriate header modification and address translations. Once complete, the SIP peer 104 and the telephony server 112 begin transmission of the media portion of the call directly between the two using Real-time Transport Protocol (RTP) thus splitting the paths of the call control and media stream.

With the first leg of the call established, a second leg of the call is then created. The telephony server 112 broadcasts events which occur on a socket. The Automatic Call Distributor (ACD) 113, listening on the socket, detects the new call creation event occurring within the telephony server 112. Also to note, included in the event details is the UUID of the call. The ACD 113, while monitoring and managing user/device sessions within the system 110, will perform routing logic and instruct the telephone server 112 on how to route the call. For example, according to one embodiment, the telephony server 112 connects the call to a user's extension/phone device 114. Once the phone at endpoint 114 is taken off-hook, the transmission of media in RTP format or other applicable formats between both endpoints 100, 114 and all points in between 101, 104, and 112 occurs.

As described above, a VoIP system 110 generally employs multiple hardware or software components or servers to provide a plurality of telecommunication services to a call between communication endpoints. Such telecommunication services may include but are not limited to proxy service, routing service, redirect service, signaling service, media transportation service, web service, database service, directory service, billing service, ACD service, telephony service, operation, alarm and maintenance service, configuration service, administrative service, and any combination of the above or any other future services that may be made available.

Given the complexity of the above services, most of the services are generally provided or implemented using servers which may include hardware or computer running respective software. However, in the present description, the term "server" or "component" may also include a portion of a computer and/or a portion of software running thereon. These servers are often in communication with each other to accommodate the interactions between the services. The increased demands for new VoIP applications and new and better services have put significant pressure on the availability and robustness of VoIP systems such as system 110.

In particular, a fault or failure in an individual component or server may result in a call being dropped. Generally, such fault or failure would be an event or condition which prohibits the typical and expected behavior of the system with respect to at least one endpoint of the call. These may include hardware failures in a component rendering the component completely unresponsive; resource and usage of component resources meeting or exceeding threshold limit, such as random access memory (RAM) limits, hard drive capacity, etc.; and software failures rendering any service critical to the component itself unresponsive or negatively impacting the typical and expected behavior of the component or server or software running thereon. In other words, when a fault or failure occurs, the component is not available to provide the telecommunication service that is intended to be provided by the component.

To achieve fail-safe call service, the embodiments described herein include a fail-safe system providing redundancy to the components or servers of the VoIP system 110. According to one embodiment of the present invention, redundancy is provided by implementing high availability (HA) pairs of each server. In this implementation, there are two fully functional identical units of any software component, one of them is called the 'Main' (or 'Master') and the other is the 'Standby'. The main server is actively providing its service. The standby server is waiting to be activated to provide service. The data will be kept synchronized between the Main and the Standby. When 'Main' fails, the 'Standby' should be ready to take over upon activation or instruction from the overseeing means/call recovery means.

Another way to provide redundancy is to implement one or more hot spare servers for one or more operational servers, or N+M redundancy. In this situation, N servers are 'Operational', actively providing service, and M servers are 'Hot Spare', waiting to be activated to provide service. The overseeing means/call recovery means may elevate or activate a hot spare server into an operational server. For instance, if there are 4 'Main'/'Operational' telephony servers and 2 'Standby'/'Hot Spare' telephony servers, and if one of the main telephony servers fails, then the one of the 'Hot Spare' telephony servers will be activated to recover the failed telephony server.

To provide fast call survival from server failure, the embodiments described herein provide means for detecting failure of at least one active call serving component and upon detection of a failure in a serving component, switching the service over to at least one stand-by component. Preferably, the detection and monitoring means such as watchdog programs periodically detect and monitor failure conditions in each call serving component at a configurable frequency suitable for each component. The present invention therefore discloses a system and method for preventing an existing call, whether established or to be established, from being dropped due to a single point of failure within the system.

One advantage of the present invention is that the continuation or recovery of a failed call will be seamless to communication endpoints or call participants because the recovery or fail-over solution described herein is based on the failed component as opposed to relying on communication endpoints, including any intermediate endpoints (or gateways or servers, etc) to re-initiate or re-route the failed call. In other words, the continuation or recovery of a failed call is initiated without involving the communication endpoints/devices in the call.

Figure 2:
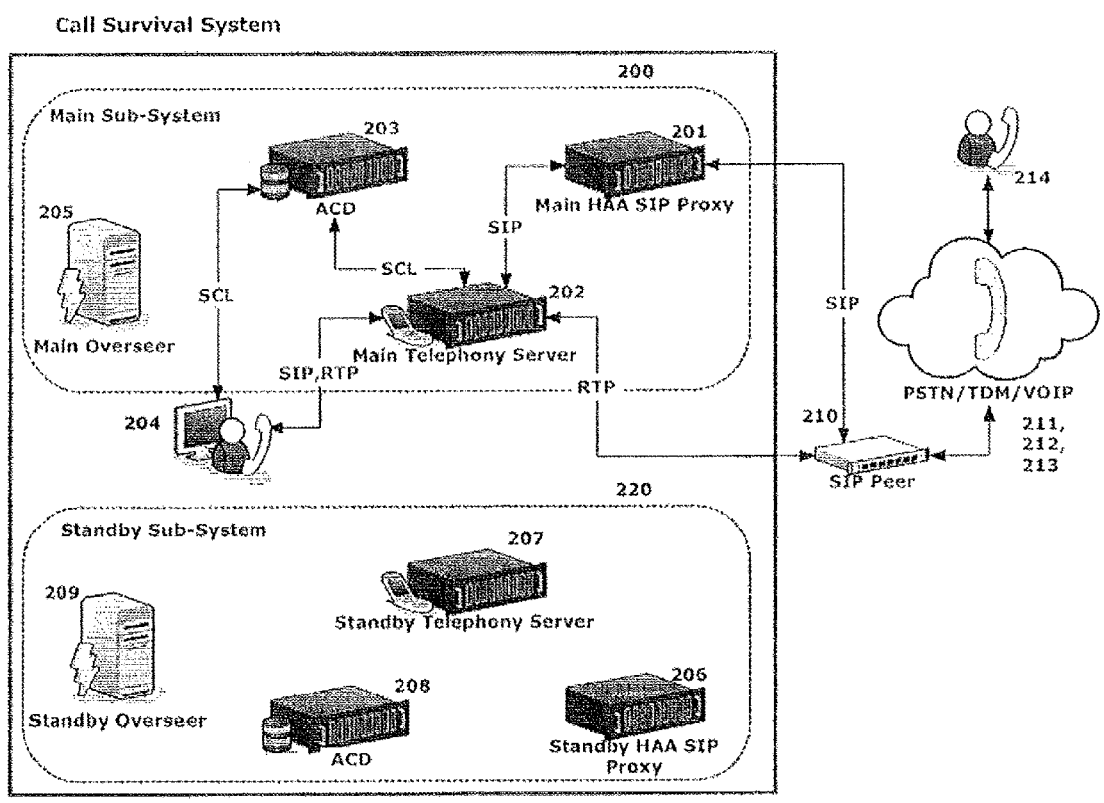
FIG. 2 is an exemplary graphical representation of a preferred embodiment of the invention.

Referring to FIG. 2, and in accordance with one embodiment of the present invention, each component in the VoIP system exists in pairs which are generally referred to as a 'Main' component and its 'Standby' component. The 'Standby' components are continuously kept in communication and in synchronization, with respect to the states of all services, with their 'Main' counterparts with the exception of the telephony servers. The telephony server 'Main' and 'Standby' components will be kept in communication and in synchronization as far as their configurations but they need not be stateful in relation to individual calls. The 'Standby' component will be instructed or configured by recovery means to become active as the 'Main' component in the event of failure to the original 'Main' component. It is to be understood that the terminologies such as "main" or "standby" refer to the current or active role of a server and thus do not associate with a server in a permanent manner. In other words, the role of any server may switch between "main" and "standby" depending on the conditions of the server and the conditions of the system. Other similar terminologies such as "primary", "master" can be used interchangeably with "main" in the present description; whereas terminologies such as "secondary", "passive", "backup" can be used interchangeably with "standby" in the present description.

In some embodiments of the present invention, there may be one or more standby servers for each active main server providing a particular telecommunication service as mentioned above. Generally, each of the main and standby servers is operable to provide the particular telecommunication service that the server is designed for. Each main or standby server can be individually configured or activated to operate in an active mode where the server is actively serving calls, or to operate in a passive or waiting mode where the server is not actively serving calls but functions in a manner such that it can take over the role of serving calls upon a switch over command from the system. The components or programs that are responsible for detecting server failures and managing server recovery or switch over will be described in more detail hereinafter.

As shown in FIG. 2, a call can be established between an external communication endpoint 214 and an internal communication endpoint 204. The call may go through the PSTN 211, a TDM network 212, a VoIP network 213, or any combination of the above networks, and reaches the SIP peer 210.

The VoIP system in FIG. 2 comprises a main HAA SIP server 201 and a standby HAA SIP server 206, a main telephony server 202 and a standby telephony server 207, and a main ACD server 203 and a standby ACD server 208. The VoIP system further comprises means for continuously monitoring or detecting the availability and sanity of all components, and means for initiating the recovery procedures needed to recover the failed components. An example of the recovery means in accordance with one embodiment of the present invention is illustrated in FIG. 2, which shows a main recovery server or overseer 205 and a standby recovery server or overseer 209.

The detecting/monitoring means of the VoIP system may include watchdog software programs that can be implemented on each server or component, including the main and standby overseers 205 and 209. Alternatively, the detecting/monitoring means can be deployed as a separate server or component of the VoIP system. In other words, the detecting/monitoring means can be integrated into at least one server of the VoIP system, or can be a stand-alone server in communication with the server or component that is under monitoring. Advantageously, the watchdog programs are tailored specifically for the duties of the component or the particular telecommunication service provided thereby. For example, each type of server or component will have its selected processes for monitoring, acceptable level of resource utilization, alarm level of resource utilization, alarm states, and failure criteria. At least some of the above characteristics are configurable for each server using any method that is known in the art.

The watchdog programs will monitor resource utilization at the basic system level within the component such as disk space utilization, random access memory utilization, processor load etc. In addition, the watchdog programs perform functional level tests in relation to various servers. These tests may include process/thread testing, deadlock checking, and response times from different modules or functional blocks within a server. Furthermore, the watchdog programs also test connectivity between servers or components. For example, this may include testing the physical connections, measuring the power levels on the links, sending and/or receiving test messages/packets over the connections, and assessing quality of the connections. In one embodiment of the present invention, the tests include "ping" tests to various servers such as SIP proxy servers 201 and 206 or telephony servers 202 and 207, response, delay or lag tests to various servers, and various physical and/or logical functions of each server and between different servers. For example, if a test message is received but the delay is over a predetermined threshold, then the recovery servers 205 and 209 will, based on the test results, determine that the connection and the server under testing are unavailable. In addition, a failure to receive response or reporting within a predetermined time period from a watchdog program for a server will be deemed by recovery servers 205 and 209 as a failure of the server.

In accordance with one embodiment of the present invention, the recovery means of the fail-safe system may include software programs that can be deployed or implemented on separate recovery servers or components 205 and 209 of the VoIP system. Alternatively, it can co-exist with any server of the VoIP system. In another embodiment of the VoIP system described herein, the recovery means include the detecting/monitoring means and the watchdog programs of the VoIP system described above.

In accordance with one embodiment of the present invention, a watchdog program will run predetermined tests on the component it is watching (generally the same server where it is running) and on the services running within the component. These tests are executed in predetermined frequency and the test results are reported or pushed to the designated main recovery server or overseer 205 in the same frequency using any suitable communication means or protocols including socket command protocol. Preferably, the testing and reporting frequency is configurable and is generally configured to be less than the signaling timeout periods usually defined by the communication endpoints of a call. Furthermore, the testing and reporting frequency can be individually configured with respect to each server or component and/or the service being provided thereby, and at sub-component and individual hardware and process level. For example, tests to check if the SIP proxy servers 201 and 206 and telephony servers 202 and 207 are able to accept SIP connections would run at least multiple times per second, or about every 20 ms to about every few seconds. In contrast, a check of disk space usage of a server may run at a lower frequency such as a few times per day as typically a disk drive approaching a certain capacity would trigger an alarm which could be resolved prior to any actual failure.

Thus, all components are continuously monitored by the main overseer 205 and watchdog programs for any instance of failure or fault which negatively impacts call quality and system sanity or otherwise renders a component or server unavailable for providing call related service.

The primary role of the main recovery server or overseer 205 is to know the states of all components that run and are capable of call recovery and to initiate appropriate switchover in case of any deemed failure. The secondary role is to be the central point for all system 200, 220 alerts, updates, and status.

In some embodiments of the present invention, an individual watchdog program exists within every component or server. In terms of functionality, the watchdog program monitors the availability, health and sanity of the component including its hardware and the software that is critical to its duties within the system 200, 220. Essentially, the watchdog programs are tasked with performing pre-defined tests on the sanity and state of each individual component while the overseer 205, 209 is tasked with monitoring and analyzing the results of the various watchdog programs. The watchdog programs report the test results back to the main overseer 205, and may also send test results, information or commands to the other components or servers. It is ultimately the duty of the main overseer 205 to determine if the results from the watchdog programs are cause to initiate recovery procedures. These recovery procedures are unique to each type of component depending on the type of telecommunication service provided.

To further illustrate a preferred embodiment of the present invention as described above, we now refer to FIG. 2, with the assumption that one or more calls are on-going.

In the event of failure to the 'Main' HAA SIP proxy 201, any and all ongoing calls between the SIP peer 210 and the end-points 204 will continue uninterrupted as the media is still able to transmit directly between the SIP peer 210 and the telephony server 202 as before, unaffected by the failure of the 'Main' HAA SIP proxy 201. However, during this time of failure, any new attempts from the SIP peer 210 to establish a call, via a SIP invite command to the 'Main' HAA SIP proxy 201 (referencing its IP address), will fail. The SIP peer 210 will continue to re-send the SIP invite command to the IP address of the 'Main' HAA SIP proxy 201 until either it receives a response back or until a pre-determined or pre-configured timeout duration has expired in the SIP peer 210. The pre-determined timeout period is well defined according to SIP signaling protocol, and generally ranges from about a few seconds to tens of seconds or more.

In order to ensure that the new calls attempted to be established, along with the ongoing calls, are not dropped or lost, the main overseer 205, upon determining that the 'Main' HAA SIP proxy 201 has failed (through test results provided by various watchdog programs), begins the recovery process defined for HAA SIP proxies. This involves the main overseer 205 instructing or activating the 'Standby' HAA SIP proxy 206 to take over and configure itself as having the 'Main' HAA SIP proxy's 201 IP address. The duration of this recovery process occurs in less time than the pre-configured timeout duration in the SIP peer 210 to ensure that all attempts from the SIP peer 210 to 'Main' HAA SIP proxy's 201 IP address are properly responded to from 'Standby' HAA SIP proxy 206 before the call is considered to have been failed by the SIP peer 210.

In the event of failure to the 'Main' telephony server 202, any and all ongoing calls between the SIP peer 210 and the endpoints 204 will experience a momentary loss of media. However, the call from the perspective of the SIP peer 210 and inherently the external endpoint 214 will remain alive from a structural or call signaling view point. This is due to the fact that the SIP control communication between the SIP peer 210 and the HAA SIP proxy 201 is still functioning properly as before the failure. The SIP peer 210 is unaware that the internal endpoint 204 is no longer involved as a consequence of the failure to the 'Main' telephony server 202.

Upon determination of failure (through test results provided by various watchdog programs) of the 'Main' telephony server 202, the main overseer 205 begins the recovery process defined for telephony servers by instructing the 'Main' HAA SIP proxy 201 that the 'Standby' telephony server 207 is now to act as the new 'Main' telephony server. At this time the main overseer 205 also informs the 'Main' ACD 203 of the telephony server state changes. The 'Main' HAA SIP proxy 201 proceeds by sending new SIP invites (with data from the original invite) for all the ongoing calls currently being held to the 'Standby' telephony server 207. Since the telephony servers 202, 207 are stateless, the 'Standby' telephony server 207 treats any invite as though it is a new call. It proceeds to send back the proper SIP acknowledgment (an OK) to the 'Main' HAA SIP proxy 201. The 'Main' HAA SIP proxy 201 sends back a SIP response (ACK) to the 'Standby' telephony server 207 but since at this time the SIP peer 210 already has an active call control leg of the call still active, the 'Main' HAA SIP proxy 201 does not pass the OK on to the SIP peer 210. As part of the recovery process, the 'Standby' telephony server 207 issues a SIP re-invite which gets passed through the 'Main' HAA SIP proxy 201 to the SIP peer 210. This re-invite contains the IP address and associated information of the 'Standby' telephony server 207. The SIP peer 210 responds with an OK along with its IP address and associated information back through the 'Main' HAA SIP proxy 201 to the 'Standby' telephony server 207, at which time it responds with an ACK. The first leg is now reestablished. It next begins the reestablishment of the second leg. The 'Standby' telephony server 207 continues on just as the 'Main' telephony server 202 had done when initially creating the call, including creating the call events which the ACD 203 detects and processes. Since the UUID of the call is still available within the SIP headers, the 'Main' ACD 203 is able to associate it with the call that was disrupted due to the failure and instruct the 'Standby' telephony server 207 to route the call to the exact end-point 204 which was originally connected to the call. At this time, the transmission of media (RTP) between both endpoints 204, 214 and all points in between 207, 210, and 211 continues once again. The temporary media loss occurs only for the duration of this recovery process, which is negligible in practical terms of a typical call.

In the event of failure to the 'Main' ACD 203, any and all ongoing calls between the SIP peer 210 and the endpoints 204 will continue uninterrupted as the media is still able to transmit directly as before between the SIP peer 210 and the telephony server 202, and between the telephony server 202 and the endpoint 204, unaffected by the failure of the 'Main' ACD 203. During the time of this failure, all new calls being established are completed successfully as when the system is operating in standard fashion until the stage that the 'Main' ACD 203 would detect and handle events created by the 'Main' telephony server 202.

Upon determination of failure of the 'Main' ACD 203 (through test results provided by various watchdog programs), the main overseer 205 begins the recovery process defined for ACDs. This involves the main overseer 205 instructing or activating the 'Standby' ACD 208 to take over and configure itself as having the 'Main' ACD's 203 IP address. Once this change has been completed, the 'Standby' ACD 208, now acting as the new 'Main' ACD, is able to continue with the process of establishing the call. Since the 'Standby' ACD 208 has been kept in synchronization, with respect to the states of calls and services, with the 'Main' ACD 203 until the time of failure, it is able to continue from the point of failure. To handle the events between the point of failure of the 'Main' ACD 203 and itself becoming active, the 'Standby' ACD 208 is able to "listen" on the same socket that the 'Main' ACD 203 listened on, therefore knowing the events which to handle and process during that period. The duration of this recovery process is negligible in practical terms of a typical call.

In the event of failure to the 'Main' overseer 205, any and all ongoing calls between the SIP peer 210 and the endpoints 204 will continue uninterrupted as no disruption in SIP signaling or media has occurred within the system 200, 220. New calls are able to be established without incident. Upon determination by the 'Standby' Overseer 209 of failure occurring with the 'Main' Overseer 205 (through test results provided by various watchdog programs), the 'Standby' Overseer 209 begins the recovery process defined for recovery servers or overseers. This involves the 'Standby' Overseer 209 taking over the IP address of the 'Main' overseer 205, as well as actively taking over the role of a 'Main' overseer and performing the duties associated therewith.

In the event of failure to any of the 'Standby' components, any and all ongoing calls between the SIP peer 210 and the endpoints 204 will continue uninterrupted as no disruption in SIP signaling or media has occurred within the system 200, 220. New calls are able to be established without incident. The 'Main' Overseer 205, upon detection of failure in the 'Standby' components, begins the recovery process defined for 'Standby' components by flagging failure of the component and requiring future action.

As noted above, for each telecommunication service, the 'Standby' components are continuously kept in communication and in synchronization, in relation to the states of all services, with their 'Main' counterparts with the exception of the telephony servers. The telephony server 'Main' and 'Standby' components will be kept in communication and in synchronization as far as their configurations but they need not be stateful in relation to individual calls. In addition, standby recovery means 209 are continuously kept in communication and in synchronization, in relation to the states of all services, with the main recovery means 205. The synchronized states include all real-time, cache, in-memory and/or configuration data on the status of the server or component, as well as all information relating to calls served by the server or component.

The advantage of keeping the main and the standby servers in synchronization is that the switch over of servers can be achieved almost instantaneously without any interruption to the on-going calls or interruption to the telecommunication service provided by the main server.

The present invention thus provides a fail-safe system for providing a specific telecommunication service, for example, a SIP proxy service. Such fail-safe system comprises a plurality of servers, each being operable to provide the telecommunication service, at least one server being active to provide the service, at least one server waiting to be activated to provide the service. The fail-safe system further comprises means for detecting failure or unavailability of each server, and means for activating at least one waiting server to provide the telecommunication service. When a failure in the at least one activated server is detected or when the at least one activated server becomes unavailable to provide service, at least one available waiting server is activated to provide the telecommunication service without interruption. Advantageously, the available waiting server is activated without involving the communication endpoints/devices in the call.

Preferably, each standby server in the fail-safe system is continuously in communication and in synchronization with the main server in the fail-safe system. Therefore, any relevant events, changes or updates occurring in the main server will be notified to or shared with the standby servers. In one embodiment according to the present invention, the synchronization is achieved by the main server sending or pushing changes and/or updates to the standby servers. In another embodiment of the present invention, the standby server may poll or request updates from the main server. In another embodiment of the present invention, shared memory or distributed databases can be used for synchronization purposes. Any other synchronization mechanism can also be used for sharing server updates and service related data between servers, as would be understood by a person skilled in the art.

Also preferably, each main server and standby server and watchdog program associated therewith is continuously in communication and in synchronization with the main Overseer 205 in a manner described above. As a result, the main and standby Overseers 205 and 209 will maintain up to date states of all the servers and their services. This in turn allows the main Overseer 205 to optimize its fail-safe server recovery procedures according to the overall status of the VoIP system 200, 220, the availabilities of the standby servers and any priority arrangements of the standby servers.

According to one embodiment of the present invention, each watchdog program has a priority number, which can be used to enable watchdog programs to provide recovery or overseer functionality. Specifically, the watchdog program with the highest priority which is not an Overseer 205 or 209 will play a special role of being the backup of the standby Overseer 209. In other words, if both the main Overseer 205 and the standby Overseer 209 fail, the watchdog program having the highest priority will take over the role of the main Overseer. The priority numbers for the watchdog programs may be pre-configured or randomly assigned. The priority numbers may also be dynamically adjusted depending on the availability of resources of each server or any other relevant factors.

The embodiments of the present invention described herein can be implemented using a computer or in digital electronic circuitry, or in hardware, firmware, software, or in any combination thereof. Systems and apparatuses in accordance with various embodiments of the present invention can be implemented in a computer program product tangibly embodied in a machine-readable storage device, such as memory, for execution by a programmable processor. Methods in accordance with various embodiments of the present invention can be performed by a programmable processor executing a program of instructions to give effect to the functions of the present invention by operating on input data and generating output. Suitable processors include, by way of example, various general and specific microprocessors.

Although a preferred embodiment of the present invention has been described for illustrative purposes, those skilled in the art will appreciate that various modifications, additions and substitutions are possible, without departing from the scope of the invention as defined in the accompanying claims.

What is claimed is:

1. A system for providing a telecommunication service to a call, said call being established or to be established between at least two endpoints, the system comprising:
    a plurality of servers, at least one server being active to provide said service, at least one server waiting to be activated to provide said service; and
    a recovery device operable to determine unavailability of each server for providing said service by testing sanity of each of said plurality of servers and obtaining test results at a predetermined frequency and activating said at least one waiting server, said determining and activating being independent from said call;
    wherein each server comprises a watchdog program for performing independent functional testing of said service and resource utilization testing of each server and communicating test results to said recovery device, said independent functional testing being performed and results thereof being communicated at a frequency that is less than a signaling timeout period defined by said at least two endpoints of said call; and
    wherein when an active server is determined to be unavailable, said at least one waiting server is activated within said signaling timeout period to provide said service without interruption to said call and without involvement of said at least two endpoints.

2. A system according to claim 1, wherein said recovery device comprises a primary server actively providing recovery to the system and at least one secondary server having means for determining unavailability of said primary server, wherein when said primary server is determined to be unavailable, said at least one secondary server provides recovery without interruption.

3. A system according to claim 1, wherein said at least one waiting server is in synchronization with said at least one active server with respect to states or configurations thereof.

4. A system according to claim 2, wherein said at least one secondary recovery server is in synchronization with said primary recovery server with respect to states or configurations thereof.

5. A system according to claim 1, wherein the independent functional testing and resource utilization testing are performed at respective predetermined frequencies for each server.

6. A system according to claim 1, wherein said telecommunication service comprises at least a signaling service and a media transportation service.

7. A method of providing a telecommunication service to a call, said call being established or to be established between at least two endpoints, the method comprising the steps of:
    a) providing a plurality of servers, at least one server being active to provide said service, at least one server waiting to be activated to provide said service; and
    b) providing a recovery device configured for:
        b1) determining unavailability of each server for providing said service by testing sanity of each of said plurality of servers and obtaining test results at a predetermined frequency; and
        b2) if an active server is determined to be unavailable, activating said at least one waiting server within a signaling timeout period to provide said service without interruption to said call and without involvement of said at least two endpoints;
        wherein each server comprises a watchdog program for performing independent functional testing of said service and resource utilization testing of each server and communicating test results to said recovery device, said independent functional testing being performed and results thereof being communicated at a frequency that is less than the signaling timeout period defined by said at least two endpoints of said call; and
        wherein said determining and activating are performed independent from said call.

8. A method of claim 7, wherein said recovery procedure is performed using a primary server actively providing recovery to said plurality of servers and at least one secondary server configured for determining unavailability of said primary server, wherein when said primary server is determined to be unavailable, said at least one secondary server performs recovery without interruption.

9. A method of claim 8, wherein said at least one secondary recovery server is in synchronization with said primary recovery server with respect to states or configurations thereof.

10. A method of claim 7, wherein said at least one waiting server is in synchronization with said at least one active server with respect to states or configurations thereof.

11. A method of claim 7, wherein the independent functional testing and resource utilization testing are performed at respective predetermined frequencies for each server.

12. A method of claim 7, wherein said telecommunication service comprises at least a signaling service and a media transportation service.

13. A computer readable memory having recorded thereon statements and instructions for execution by a computer for providing a telecommunication service to a call, said call being established or to be established between at least two endpoints, said statements and instructions comprising:
   program code which, when executed, is operable to provide and configure a plurality of servers, at least one server being active to provide said service, at least one server waiting to be activated to provide said service; and
   program code which, when executed, is operable to determine an unavailability of each server for providing said service by testing sanity of each of said plurality of servers and obtaining test results at a predetermined frequency and activate said at least one waiting server, said determining and activating being independent from said call;
   wherein each server comprises a watchdog program for performing independent functional testing of said service and resource utilization testing of each server and communicating test results, said independent functional testing being performed and results thereof being communicated at a frequency that is less than a signaling timeout period defined by said at least two endpoints of said call; and
   wherein when an active server is determined to be unavailable, said at least one waiting server is activated within said signaling timeout period to provide said service without interruption to said call and without involvement of said at least two endpoints.

14. A computer readable memory of claim 13, wherein said program code is operable to activate a primary server actively providing recovery to the system and at least one secondary server configured to determine the unavailability of said primary server, wherein when said primary server is determined to be unavailable, said at least one secondary server provides recovery without interruption.

15. A computer readable memory of claim 14, wherein said at least one secondary recovery server is in synchronization with said primary recovery server with respect to states or configurations thereof.

16. A computer readable memory of claim 13, wherein said at least one waiting server is in synchronization with said at least one active server with respect to states or configurations thereof.

17. A computer readable memory of claim 13, wherein the independent functional testing and resource utilization testing are performed at respective predetermined frequencies for each server.

18. A computer readable memory of claim 13, wherein said telecommunication service comprises at least a signaling service and a media transportation service.

* * * * *